March 17, 1970     D. R. STRACK     3,500,603
SELF-SUPPORTING, NONLOAD-BEARING RESILIENT TAPE SEALANT
Filed Jan. 3, 1967
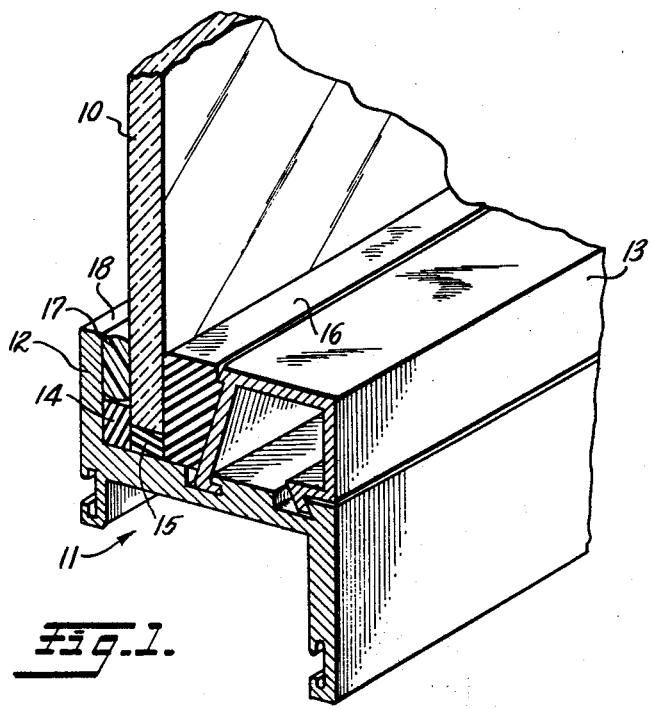
Fig.1.
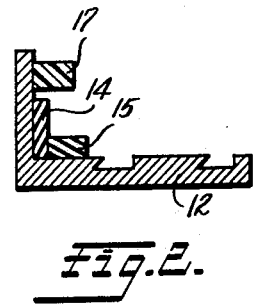
Fig.2.
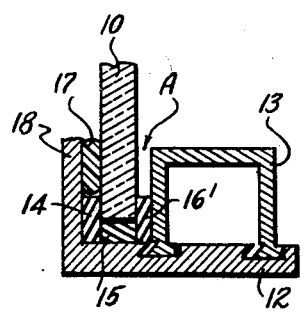
Fig.3.
Fig.4.
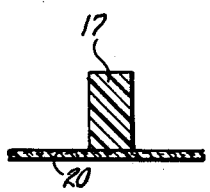
Fig.5.
INVENTOR
DONALD ROBERT STRACK
BY Dressler, Goldsmith, Clement &
Gordon    ATTORNEYS

United States Patent Office 3,500,603
Patented Mar. 17, 1970

3,500,603
SELF-SUPPORTING, NONLOAD-BEARING
RESILIENT TAPE SEALANT
Donald R. Strack, Dayton, Ohio, assignor to Protective
Treatments, Inc., Dayton, Ohio, a corporation of Ohio
Filed Jan. 3, 1967, Ser. No. 607,022
Int. Cl. E04b 1/66
U.S. Cl. 52—397                                              4 Claims

ABSTRACT OF THE DISCLOSURE

Panels are mounted in an architectural mounting using resilient elements to sustain the load, the supported panel being sealed against the weather by means of a self-supporting tape partially compressed between the panel and a wall of the mounting. The tape is formed of resilient elastomer having a Mooney value of at least 45 compounded with large amounts of plasticizing oil and filler to provide a self-supporting structure which is stable, adherent to glass and metal, incapable of bearing sustained loads and capable of maintaining a seal in a partially compressed condition.

---

The present invention relates to a tacky preformed self-supporting resilient sealing tape or rope which is stable under ambient conditions and adapted to be employed for the architectural mounting for panels to function in compression and without the capacity to bear significant load to provide a permanent weather-tight seal in the absence of any supplementary sealing expedients. The invention includes architectural mountings including such sealing tapes or ropes.

While numerous sealant materials are known and available for use in the weather proofing of mounted panels, these are generally of the character of non-self-supporting flowable putties or, if they have the character of a preformed self-supporting rope or bead, they normally require an auxiliary sealant in order to insure the achievement of a permanent weather-tight seal.

Irrespective of the form of the prior art sealants for architectural panels, such as windows, there is a tendency for the sealant to fail when the window or other panel which is mounted vibrates to place the sealant composition in tension. If the tackiness and adhesiveness of the sealant becomes impaired, the tensile stresses imposed on the window by wind buffeting, for example, can cause failure at the glass-sealant interface.

As will be evident, the putty-like sealants flow when compressed and do not remain in compression. On the other hand, load bearing ropes or beads react strongly to compression and do not function well as a sealant in a compressed condition.

Efforts have been made to compound and pressure materials in order to form a precured sealing rope of limited resilience to provide a form-retaining element which retains some resiliency in compression although the element is incapable of bearing significant load without flow. However, and while the utilization of a composition which is cured after formation is the logical way to attempt to provide the limited resilience which is desired, the utilization of a curing reaction is undesirable because it is difficult to control. When the composition is undercured, it is too soft, tacky and deformable and difficult to handle. In service, there is a tendency for the mounted panel to move up and down with expansion and contraction and such movements tend to unduly deform the undercured composition and cause it to roll upon itself creating air channels for the penetration of moisture. On the other hand, when overcuring is encountered, there is a tendency for delamination to occur (especially at the glass interface) which also breaks the desired seal. It is to be noted in this respect that curing ovens may not be maintained at the same temperature at different portions thereof so that the achievement of a precisely correct cure is quite difficult as a matter of actual industrial practice.

Accordingly, the present invention is directed to preform sealing tapes or ropes which are adapted to be placed in partial compression in an architectural mounting with the tape being protected against significant sustained loads, and the sealing tape being preformed without the utilization of any cure or curing agent while nonetheless processing the desired properties of limited resilience and tack which are essential to maintain a proper sealing function. These diverse properties in proper balance are obtained in the invention by the selection of materials and proportions as will be explained hereinafter.

Referring more particularly to the preformed sealing tape which is used, this tape must be self-supporting and possess some limited resilience so that it can be utilized in compression. This resilience is provided by the presence in the tape of a resilient elastomer. However, the tape must be essentially nonload-bearing despite the self-supporting resilient nature which is essential and this limits the proportion and character of the resilient material which is employed.

The resilient elastomer should be strongly resilient to provide, when present in relatively small proportion without postcuring the capacity to at least partially spring back when its dimension is reduced without the imposition of further load. Elastomers having the required resilience are identified by those possessing a Mooney value of at least 45, preferably 50–70.

The rope composition which includes the resilient elastomer must also contain the other components of the rope herein specified (principally plasticizing oil and particulate filler) in order that it be compressible and tacky to the extent required in its contemplated use in an architectural mounting. Proper tackiness is most important to obtain good adhesion to metal, to glass and to plastics. This requires the use of a considerable proportion of plasticizing oil. Appropriate proportions of plasticizing oil are at least 100 parts of oil per 100 parts of the elastomer, preferably from 120 to 250 parts of oil per 100 parts of elastomer. Together with the filler as herein provided the finished self-supporting rope is unable to resist a significant sustained load of the magnitude normally sustained by the resilient mounting elements used in architectural mountings of the type herein contemplated without flowing away. It is in this sense that the term "nonload-bearing" has been used.

The proportion of filler is best characterized by the hardness of the finished rope (which is actually quite soft). To measure the required softness, it is appropriate to use a 00 gauge Shore hardness scale on which values of from 40–65 are appropriate in accordance with the invention, a hardness of from 45–60 being preferred. While Shore A hardness is not an accurate measure of the soft materials here involved, these materials on this scale have a hardness of less than 10. If the tape is too soft, it is incapable of being maintained in slight compression for long periods of time without flow. Those which are too hard tend to unduly resist the compressive load which is applied so that they are not well adapted to maintain an effective seal over long periods of time under the buffeting forces which may be imposed on the tape by the panel which is mounted. Other specific disadvantages for tapes of improper physical characteristics are noted hereinafter.

Generally speaking, preferred compositions include at least 100 parts of particulate filler per 100 parts of resilient elastomer and a major proportion of the particulate filler is constituted by a stiffening filler, such as fibrous fillers illustrated by asbestos and other materials which provide resistance to shear such as silica in very finely divided form. These stiffening fillers help to provide form retaining qualities even though, when significant loads are applied and sustained, the resulting shear induces flow.

The materials and proportions specified are important in order to obtain the required balance of resilience, capacity for cold flow and tack which enables the architectural sealant function to be accomplished. Thus, rubber of too low a Mooney value, even in greater proportion, does not satisfy the problem since the proper balance of springback, tack and capacity to resist becoming hard when compressed is not present.

The tapes of the invention may include auxiliary agents such as tackifiers, wetting agents, coloring agents, and the like, for diverse auxiliary purpose.

While the invention is primarily directed to compositions which do not significantly change with time and exposure to elevated temperature as is frequently encountered when panels such as windows are subjected to solar radiation, the present invention nonetheless embraces compositions which are essentially stable even though small changes in the consistency of the tape may occur after it is applied. However, these limited changes in the invention should be essentially independent of the temperature conditions which may be encountered in use as is not the case when curing agents are incorporated in the composition to become active to make the composition significantly more resilient when elevated temperatures are encountered in service.

The function and characteristics of the resilient elastomer which is relied upon in the invention have been discussed hereinbefore and it will be understood that numerous elastomers may be used in the invention so long as these possess the Mooney value specified hereinbefore. Among the elastomers which may be selected are butyl rubber, chlorinated butyl rubber, brominated butyl rubber, butadiene-styrene rubbers, high molecular weight polyisobutylene rubber, butadiene-nitrile rubbers, polychloroprenes, natural rubber, polyisoprene, ethylene-propylene rubber, and the like. The above materials are generally well-known and numerous materials of the type noted are available in commerce.

Preference is had for butyl rubber or a cross-linked butyl rubber, a small degree of cross-linking being helpful to increase the Mooney value of the elastomer. The term butyl rubber is intended to identify copolymers of isobutlyene with a diene such as butadiene, isoprene, dimethylbutadiene, pentadiene or pipenylene in the weight ratio range of about 70 to 99.5 parts isobutylene to 30 to 0.5 parts of the diene component. An appropriate butyl rubber is a copolymer of 98–98.5% isobutylene with a 1.5–2% of isoprene having a Mooney value of about 56, and this butyl rubber may be used as such or it may be cross-linked to make it even more resilient as, for example, with 0.5% of divinylbenzene. It is stressed that many butyl rubbers do not possess the high Mooney values needed in the invention and a proper selection must be made.

As has also been previously indicated, the tapes of the invention are extensively plasticized with a considerable porportion of plasticizing oil. These plasticizing oils may be of diverse type, and include the conventional processing oils, preferred oils being those having a viscosity range of about 45–85 Saybolt Seconds Universal. Other appropriate liquid materials which may be used as the placticizing oil component are liquid polychlorinated polyphenyls. Particularly preferred plasticizers are normally liquid polyolefins, especially $C_2$–$C_4$ olefins since these are highly compatible (especially with butyl rubbers) and resistant to oxidation. These are illustrated by low molecular weight polyisobutylene liquid at room temperature, medium viscosity propylene polymer and normally liquid polybutenes and polyethylenes. Also, the chemical plasticizers such as dioctyl phthalate, dioctyl sebacate, and like plasticizers may be used in the invention. All of these plasticizers are generally known and numerous products of the types enumerated are available in commerce.

Particulate fillers are also important to the invention as has been explained and these may include pigments such as titanium dioxides and carbon black and general purpose mineral fillers such as calcium carbonate and the like. Titanium dioxide and carbon black are helpful with respect to minimizing ultraviolet degration of the composition. It is preferred, however, to include a significant proportion, preferably at least half of the total weight of filler, of a stiffening filler which may be of a fibrous character, as illustrated by asbestos which is especially preferred, or a non-fibrous character, as illustrated by other fillers of especially large surface area such as platy talcs and hydated silicas.

From the standpoint of auxiliary agents, tackifiers are of particular value since it is desired that the tapes of the invention wet metals and glass and be strongly adherent thereto. Wetting agents serve as mixing aids to facilitate dispersion of the particulate components. It will be noted here that the plasticizing oil confers considerable capacity for surface wetting and surface tackiness, but the inherent tendency of high oil loadings to provide these properties can be supplemented by tack-inducing agents and wetting agents. Tack-inducing agents are illustrated by non-reactive polymethylol phenol resins, rosin, hydrogenated rosin, esterified rosin and ethylene glycol monobutyl ether perlargonate. Adhesion-promoting agents are also useful and these may be incorporated in the tape or applied as a primer to the surface to which adhesion is desired, e.g., to the margin of a glass panel being mounted. The silanes are especially valuable for promoting adhesion, these being illustrated by gamma-aminopropyltriethoxysilane.

From the standpoint of wetting agents, these may be anionic, cationic, or non-ionic and are wholly optional.

Still other auxiliary agents which may be used are oxidation and corrosion inhibitors, stabilizing agents, and also scorch retardants and roll release agents and the like which may assist in the milling operation depending on the components selected and the production procedures utilized.

It is to be understood that the elastomer, the plasticizing oil and the filler are to be milled into compatible admixture with one another and the specific materials and auxiliary agents which are used and the processing conditions employed should be selected with this in mind.

Referring more particularly to the architectural mounting combination which is utilized in the invention, the panel being mounted, such as a glass plate forming a window or wall, is positioned upon a supporting frame with resilient members being interposed between the frame and the panel to resiliently sustain the load of the panel. The sealing tape of the invention is adhered to the supporting frame and the tape and resilient members are dimensioned so that the tape is partially compressed when the panel is positioned upon the resilient members. A removable stop is normally used together with a further resilient element in order to fix the panel in its desired resting place.

When the panel is subjected to expansion and contraction and vibration and buffeting loads of various types as may be encountered from the wind, the panel is free to move within its resilient enclosure, the resilient members accepting and sustaining whatever loads are applied. The sealing tape of the invention is maintained in its partially compressed condition at all times and it does not bear the load. As a result, the sealing tape is continually expanding (spring back) into sealing contact with the mounted panel to maintain a weather-proof seal for long period of time.

The invention is illustrated in the accompanying drawing in which:

FIG. 1 is a partial perspective view showing a sealing tape constructed in accordance with the invention used to mount a glass panel in a frame;

FIG. 2 is a cross-section diagrammatically showing a supporting frame ready to receive the glass plate to be mounted;

FIG. 3 shows the glass plate placed in position with the sealing tape compressed thereby;

FIG. 4 diagrammatically shows the completed achitectural mounting unit in which a removable stop member has been applied to fix the glass plate in its desired position; and FIG. 5 is a cross-section showing a rectangular tape made in accordance with the invention and supported ready for use on a release strip.

Referring more particularly to FIG. 1 this perspective view shows a glass plate mounted in accordance with the invention. The glass plate is identified by the numeral 10 and it is mounted in a frame indicated generally by the numeral 11 and which comprises a supporting frame 12 and a removable stop 13. As can be seen, the margin of the glass plate 10 is surrounded by resilient members 14, 15 and 16 which may be made of rubber, neoprene or the like and which sustain the load of the plate 10 both while it is at rest and also while it is buffeted or vibrated. These resilient members are conveniently selected so that the setting block 15 has a Shore A durometer hardness of 70–90 and the other resilient members 14 and 16 which may be termed spacer blocks, have a Shore A durometer hardness of 50–70. Thus, the plate 10 is relatively free to move, but as soon as it does so, its movement is resisted by the resilient elements which surround its margin so that significant lateral movement is prevented.

Sandwiched between the supporting frame and the margin of the glass plate is a sealant tape or rope identified by the numeral 17. As will later be more fully seen, this tape 17 is compressed between the inner face of the outer upstanding flange 18 of the supporting frame 12 and the outer surface of the margin of the plate 10. While the tape 17 is compressed, there is no load upon it forcing any further compression because any tendency of the plate 10 to further compress the tape 17 is resisted by the resilient element 14.

The resilient element 16 is wedge-shaped in the form of the invention pictured and the removable stop 13 is snapped in place and the wedge-shaped resilient element is then forced into position as will be apparent from the drawing, to force the glass against the resilient element 14. It will be equally apparent that the specific structure of the frame element and the removable stop as well as the shape of the resilient elements 14, 15 and 16 are not of prime significance, though it is preferred to have the sealant tape or rope 17 contact surfaces which are generally vertical since, in this way, it is easiest to prevent sustained loads from being imposed thereon.

The utilization of the tapes of the invention will be better understood from the sequential views shown in FIGS. 2, 3 and 4.

Referring to FIG. 2, the frame support is again numbered 12 and it will be seen that the resilient elements 14 and 15 are positioned on the frame support 12 ready to receive the glass plate 10. It will also be seen that the outer flange 18 of the frame support 12 has adhered to its inner surface the sealant tape 17 which is shown in its preferred form which is generally rectangular with the length of the rectangle extending away from the flange 18. FIG. 3 shows the structure after the glass plate 10 has been preliminarily positioned on the resilient element 15, the glass plate 10 being slid laterally to compress the sealant tape 17 to the extent that the longer dimension of the compressed structure now parallels the plane of the plate and the flange. It is desired that the length of the generally rectangular tape exceed its width by from 10—200%, preferably from 20–150% and that the initial length of the generally rectangular tape be reduced by partial compression in use to an extent of from 15 to 70%, more preferably from 30 to 60%, and most preferably from 35 to 50%. In the diagrammatic illustration shown, the sealant tape 17 is out of contact with the resilient support element but this is not essential.

Referring to FIG. 4, a resilient element 16' has been inserted as shown and the removable stop 13 has been snapped in place so that the plate 10 is not free to move inwardly. If desired, a caulking or mastic may be applied in the space identified by Arrow A.

The full lateral movement of the glass plate and the attendant partial compression of the sealant tape normally awaits the application of the removable stop and the application of the interior resilient element 16'.

The tapes or ropes of the invention are desirably provided on a temporary mounting strip 20 which facilitates handling. These mounting strips are simply non-adhesive sheets which are, per se, well-known for the dispensing of sticky materials including sticky preformed tapes or ropes and form no part of the present invention by themselves. On the other hand, the tapes of the invention are generally rectangular as has been explained and in order that a short face of the rectangle is the principal surface available, the other short face of the rectangular tape is adhered to the supporting strip as can be seen in FIG. 5.

The invention is illustrated in the examples which follow.

EXAMPLES 1–3
(All parts by weight)

| Component | Example 1 Grey | Example 2 Black | Example 3 High Resilience Type |
|---|---|---|---|
| 1. Butyl rubber—Mooney value about 60 [1] | 200 | 200 | 250 |
| 2. Nonheat-reactive solid condensate of phenol with formaldehyde having an acid number of 20–40 tackifier) | 84 | 84 | 217 |
| 3. Hydrogenated wood rosin ester [2] | 20 | 20 | 49 |
| 4. Tall oil fatty acid (wetting agent) | 4 | 4 | 11 |
| 5. Asbestos | 92 | 92 | 228 |
| 6. Precipated hydrated silica having a surface area of 140–160 sq. meters/gm | 92 | 92 | 228 |
| 7. Platy talc (very finely divided) | 40 | 40 | 109 |
| 8. Titanium dioxide pigment (anatase) | 80 | | 200 |
| 9. Liquid polybutene (Gardner-Holdt viscosity at 77° F. of Z 4+) | 380 | 380 | 609 |
| 10. Carbon black | 2 | 40 | 11 |
| 11. Heat-reactive phenol-formaldehyde condensate in 95% water solution (adhesion promoter) | 20 | 20 | 50 |
| 12. Gamma-aminopropyl-triethoxysilane | 1.26 | 1.26 | 5 |
| 13. Divinyl benzene cross-linked butyl rubber [3] | | | 250 |

[1] A high molecular weight copolymer of 98–98.5% isobutylene with 1.5–2% isoprene, containing about 1.6 mol percent unsaturation and a Mooney value of about 60.

[2] Hydrogenated wood rosin ester having an ASTM Ring & Ball softening point of 68° C., an acid number of 165 and a saponification number of 167.

[3] Copolymer of 98–98.5% isobutylene with 1.5–2% isoprene cross-linked with 0.5% divinyl benzene to increase resiliency (Mooney value above 70.)

The components named above are milled together using an internal type mixer of the character commonly used for the mixing of bread dough. The mixing operation is continued until the composition is uniform, four hours of mixing being used in each of the above examples. When mixing is complete the composition is extruded onto a supporting non-adhesive strip such as a silicone-coated kraft release paper.

In these examples, the composition is extruded as a preformed rectangular tape having cross-sectional dimensions of 1/4 x 3/16 inch. The short 3/16 inch face is placed upon the release paper so that the opposed short 3/16 inch face can be easily adhered to the metal face of an architectural mounting whereupon the long dimension of the rectangular tape is available to be partially compressed between the metal face of the mounting and the panel which is supported by that mounting as shown in the drawings forming a part of this application.

In each instance, the tape is self-supporting, unable to sustain significant loads and resilient in the sense that when partially compressed, the compositions tend to maintain a tendency to spring back. The tapes are strongly adherent to both metal and glass as indicated by the adhesion test noted below.

The sealant tape of the invention is subjected as an adhesion test to being adhered by its opposed shorter faces to an aluminum panel on the one hand, and a glass plate on the other. The glass plate is then moved toward the aluminum panel to reduce the original lengthwise dimension of the tape by 50%. The composite so-formed is then opened in the manner of a book until the rear faces of the plate and the panel are in contact with one another (a rotation of 360°). The adhesive seal of the tape to both the glass and the aluminum must remain intact. All of the examples in this application pass this test.

Examples 1 and 2 are particularly useful for the mounting of glass panels where the stiffness of the glass minimizes the impact forces which are transmitted to the tape of the invention. The increased resilience type of tape illustrated in Example 3 is preferred when the panel is flexible as is encountered in the mounting of methyl methacrylate panels. In this event, the inclusion of a proportion of butyl rubber which has been cross-linked with divinyl benzene to provide an even higher Mooney value is helpful in sustaining the higher impact loads which are associated with the more flexible acrylic panels.

EXAMPLES 4-6

In commercial practice, it is desirable to employ commercially available products and Examples 1-3 above are repeated using a corresponding weight of commercially available products as listed below for the corresponding component in Examples 1-3. Essentially the same results are obtained.

| Component | Trademark | Supplier |
| --- | --- | --- |
| 1. Butyl rubber | Polysar Butyl 301 | Polymer Corporation Ltd. (Canada). |
| 2. Nonheat-reactive phenolformaldehyde resin. | Amberol ST-137X | Rohm & Haas Co. |
| 3. Hydrogenated rosin ester. | Staybelite resin | Hercules Powder Co. |
| 4. Tall oil fatty acid | Acintol FA2 Tall Oil Fatty Acid. | Arizona Chemical Co. |
| 5. Asbestos | 7M06 Grade | John's Manville. |
| 6. Hydrated silica | Hi-Sil | PPG Chemicals. |
| 7. Platy talc | Mistron Vapor | Sierra Talc & Chemical Co. |
| 8. Titanium dioxide pigment. | R-900 Pigment | DuPont. |
| 9. Liquid polybutene | Indopol polybutene H-50 | Amoco Chemicals Corp. |
| 10. Carbon Black | P-33 Carbon Black | R. T. Vanderbilt Co. |
| 11. Heat-reactive phenol-formaldehyde resin. | BRL 2741 | Union Carbide Corp. |
| 12. Silane | A-1100 Silane | Do. |
| 13. Divinyl benzene-cross-linked butyl rubber. | Polysar XPRD-A-925 | Polymer Corporation Ltd. (Canada). |

As will be perceived from the illustrations provided hereinbefore, there are numerous advantages which accrue from the utilization of compositions as have been described. First, processing costs are considerably reduced since all of the physical manipulations and care which are required in a curing operation are dispensed with. Further and since the compositions lack curing agents which tend to cause slow cure at room temperature, the stability of the composition prior to use is better and, similarly, the finished products have better shelf stability. Also, and as explained hereinbefore, the tendency of solar heat to cause curing in situ is substantially eliminated and this is most helpful in preventing strong wind buffeting forces from causing the product to lose its adhesion to glass which, of course, leads to water leakage. Still further, the compositions of the foregoing examples enable superior quality control and it is easier to insure the production of tapes of proper quality as each batch is processed. In contrast, the precured materials created a situation of poor quality control. The difficulties of undercuring and overcuring, which are largely eliminated by the superior quality control in accordance with the invention, are noted below to emphasize the advantages of eliminating these factors.

Disadvantages accruing from undercuring (a) too low in modulus (lack of elastomeric properties)
(b) too much tack
(c) low in cohesive strength
(d) poor shape retention in rolls Disadvantages accruing from overcuring (a) too high in modulus
(b) too little adhesion
(c) high compressive load for installation The invention is not to be construed by an abstract of disclosure, but its features are instead characterized in the description given hereinbefore and is defined in the claims which is follow.

I claim:
1. An architectural mounting combination comprising a panel having its margin positioned within a supporting frame, resilient elements interposed between said frame and the margin of said panel, said resilient elements sustaining the load of said panel, and a preformed, soft, tacky, self-supporting resilient sealing tape partially compressed between the margin of said panel and said supporting frame, said tape being substantially stable under ambient conditions and incapable of bearing sustained loads but capable of maintaining a seal in its partially compressed condition, and comprising resilient elastomer having a Mooney value of at least 45, at least 100 parts of plasticizing oil per 100 parts of elastomer, and said tape being filled with at least 100 parts of particulate filler per 100 parts of elastomer to provide a 00 gauge Short hardness of from 40-45, said resilient elements being positioned and dimensioned to prevent any sustained load from being transmitted to said compressed tape, and said tape being free of curing agents for the elastomer present therein.

2. A mounting combination as recited in claim 1 in which said tape is compressed to an extent of from 15 to 70%.

3. A mounting combination as recited in claim 1 in which said tape is generally rectangular with its length exceeding its width by 20-150% and said tape is positioned so that its length extends from said frame to said panel, said tape being compressed to an extent of from 30-60% of its initial length.

4. A mounting combination as recited in claim 2 in which said tape is compressed by about 30 to 60 percent of original thickness.

(References on following page)

References Cited

UNITED STATES PATENTS

| | | | |
|---|---|---|---|
| 2,402,189 | 6/1946 | Soday | 260—36 |
| 2,815,335 | 12/1957 | Welch | 260—888 |
| 2,864,882 | 12/1958 | Snell | 174—84 |
| 2,955,102 | 10/1960 | Clayton | 260—79.5 |
| 2,974,377 | 3/1961 | Kunkle | 52—616 |
| 3,009,904 | 11/1961 | Serniuk | 260—85.3 |
| 3,076,777 | 2/1963 | Zeolla | 260—888 |
| 3,402,220 | 9/1968 | Bierman et al. | 260—888 |
| 2,274,749 | 3/1942 | Smyers | 260—88.2 |
| 2,702,286 | 2/1955 | Iknayan. | |
| 2,979,788 | 4/1961 | Richardson | 52—400 |
| 2,999,822 | 9/1961 | Pfau et al. | 260—33.6 |
| 3,105,274 | 10/1963 | Armstrong | 52—39 |
| 3,274,740 | 9/1966 | Hall | 52—47 |
| 2,454,821 | 11/1948 | McKee | 206—5 |
| 3,016,993 | 1/1962 | Owen | 52—39 |
| 3,244,663 | 4/1966 | Corr | 260—41. |

OTHER REFERENCES

Handbook of Adhesives—Reinhold Publishing Co 1962, pp. 563–567.

JOHN E. MURTAGH, Primary Examiner

U.S. Cl. X.R.

52—403; 260—33.6, 41.5